United States Patent [19]

Sinn et al.

[11] Patent Number: 4,593,574

[45] Date of Patent: Jun. 10, 1986

[54] TORQUE-DEPENDENT PRESSURE MECHANISM FOR CONTINUOUSLY ADJUSTABLE BALL-TYPE PLANETARY GEAR SET

[75] Inventors: Hartmut Sinn, Ehingen; Hermann Breymaier, Munderkingen; Günter Mutschler, Biberach, all of Fed. Rep. of Germany

[73] Assignee: Neuweg Fertigung GmbH, Munderkingen, Fed. Rep. of Germany

[21] Appl. No.: 487,955

[22] Filed: Apr. 25, 1983

[30] Foreign Application Priority Data

Apr. 29, 1982 [DE] Fed. Rep. of Germany ....... 3215923

[51] Int. Cl.⁴ ..................... F16H 15/26; F16H 15/00; F16H 15/50
[52] U.S. Cl. ....................... 74/198; 74/796; 74/190
[58] Field of Search ................ 74/198, 190, 796, 208, 74/200

[56] References Cited

U.S. PATENT DOCUMENTS

| | | | |
|---|---|---|---|
| 2,586,725 | 2/1952 | Schottler | 74/796 |
| 2,874,592 | 2/1959 | Oehrli | 74/796 |
| 2,905,026 | 9/1959 | Oehrli | 74/796 |
| 2,913,932 | 11/1959 | Oehrli | 74/796 |
| 3,707,888 | 1/1973 | Schottler | 74/796 |
| 3,745,844 | 7/1973 | Schottler | 74/208 |

FOREIGN PATENT DOCUMENTS

| | | |
|---|---|---|
| 2136243 | 4/1977 | Fed. Rep. of Germany . |
| 2658791 | 6/1978 | Fed. Rep. of Germany ........ 74/198 |
| 659817 | 4/1979 | U.S.S.R. ................. 74/198 |

OTHER PUBLICATIONS

"Clevland Speed Variator" Bulletin K-200, FIG. 5, Dec. 5, 1958.

*Primary Examiner*—Lawrence J. Staab
*Assistant Examiner*—Michael D. Bednarek
*Attorney, Agent, or Firm*—Michael J. Striker

[57] ABSTRACT

Torque-dependent pressing device for a ball-type planetary gear set, includes a pressure plate which is mounted for joint rotation with the driving shaft of the set and for axial displacement relative to a freely rotatable race which supports the planetary balls. The facing surfaces of the pressure plate and of the race are inclined and engage a plurality of conical or spherical rolling bodies. A radial cam, either in the form of a sinusoidal continuous groove or in the form of arcuate discrete guiding grooves, is formed in the pressure plate to engage the rolling bodies and displace the same radially relative to the driving shaft when a torque develops between the facing inclined surfaces. The rolling bodies are guided in radial direction to perform a rolling motion about a helical path until the torque is neutralized. The pressure plate is spring-biased in axial direction against the freely rotatable race.

8 Claims, 4 Drawing Figures

TORQUE-DEPENDENT PRESSURE MECHANISM FOR CONTINUOUSLY ADJUSTABLE BALL-TYPE PLANETARY GEAR SET

BACKGROUND OF THE INVENTION

The present invention relates in general to a torque-responsive pressure mechanism in a ball-type planetary gear set.

From GE Pat. No. 2,136,243 a ball-type planetary gear set with a torque-controlled pressure mechanism is known. This prior-art device includes a fixed housing supporting for rotation a first shaft on which two mutually shiftable races provided with raceways for receiving planetary balls, are arranged. A second shaft supported in the housing in alignment with the first shaft carries for joint rotation another race with outer raceway which engages from above the planetary balls. Another rotatable outer race is arranged opposite the rotary outer race to engage the planetary balls from the opposite sides, whereby its position is axially adjustable by means of the pressure device. The pressure device couples one of the races with inner raceway to the first shaft. The opposite race with the inner raceway is rigidly connected to the first shaft, whereby the pressure device, which includes a pressure disk rigidly connected to the first shaft and engaging rolling bodies which cooperate with a raceway formed on the face of an axially shiftable race which is supported for free rotation on the first shaft. In this prior-art device, the pressure disk is in the form of an axial cam ring which generates the required compressing forces.

The disadvantage of this known device is the fact that the pitch angle of the cams relative to the base plane must be smaller than the angle of internal friction between the rolling bodies and the corresponding race. On the other hand, the lower limit of the pitch angle of the cams is determined by the largest permissible axial forces. Since the angle of friction depends both on the used materials of respective functional elements and on the condition of their contact surfaces, as well as on the employed lubricating agent, the operative conditions of the device are not well defined. It has been found from experience that, if this prior-art device is subject to torsional shocks resulting for instance during the start at full load or in driving oscillatory masses, the rolling bodies create depressions in the camming surfaces. Furthermore, even minute local plastic deformations suffice to make the device inoperative. Another disadvantage of prior-art devices of this kind is the fact that at low torsions the pressure device tends to rattle because the corresponding functional elements under this operational condition cease to positively engage.

SUMMARY OF THE INVENTION

It is therefore a general object of the present invention to overcome the aforementioned disadvantages.

In particular, it is an object of this invention to provide an improved torque-dependent pressure device for ball-type planetary gear sets of the aforedescribed kind which withstand considerable momentary loads without damaging the camming surfaces.

Another object of this invention is to provide such an improved pressing device which guarantees positive coupling of the engaging elements even at minute torsional moment.

In keeping with these objects, and others which will become apparent hereafter, one feature of the invention resides in an improved torque-dependent pressure mechanism in the ball-type planetary gears of the above described kind, which comprises a pressure plate mounted on the driving shaft for joint rotation therewith and for an axial displacement relative to the opposite inner race, a plurality of rolling bodies engaging the facing surfaces of the pressure plate and the opposite inner race, the facing surfaces being inclined relative to each other, and a cam member mounted for joint rotation with the driving shaft and radially engaging the rolling bodies to displace the same radially along the inclined facing surfaces whereby the rolling bodies are set in rotation about a helical path when moving in the radial direction along the inclined surfaces. Preferably, the rolling bodies have a conical shape matching the wedge-like inclined surfaces, and the camming member engages the bodies from above.

As a result, the force produced by the torsional moment between the pressure plate and the opposite race is taken up in radial direction by two or more rolling bodies and converted, due to their wedging action, into an axial force. If desired, one of the facing surfaces engaging the rolling bodies can be normal to the axis of rotation of the supporting shaft. The raceways for the rolling bodies in the facing surfaces are made in such a manner that the bodies perform well defined rolling movements. Preferably, the rolling bodies are guided in axial direction by means of guiding rods and/or spacers.

It is also advantageous when the pressure plate is loaded in axial direction by a pressure spring which, at its remote end, is secured to a limit stop. In this manner it is achieved that all functional elements of the pressing device, that is the pressure plate, the rolling bodies, and the opposite race, are continuously in positive engagement even in the case of small positive or negative torsional moments. This feature differs substantially from the aforementioned prior-art device according to GE Pat. No. 2,136,243, where the pressure device loses positive coupling when minute torques are applied.

The novel features which are considered characteristic for the invention are set forth in particular in the appended claims. The invention itself, both as to its construction, and its method of operation, together with additional objects and advantages thereof, will be best understood from the following description of specific embodiments when read in connection with the accompanying drawing.

DESCRIPTION OF THE PREFERRED EMBODIMENTS

Figure 1:
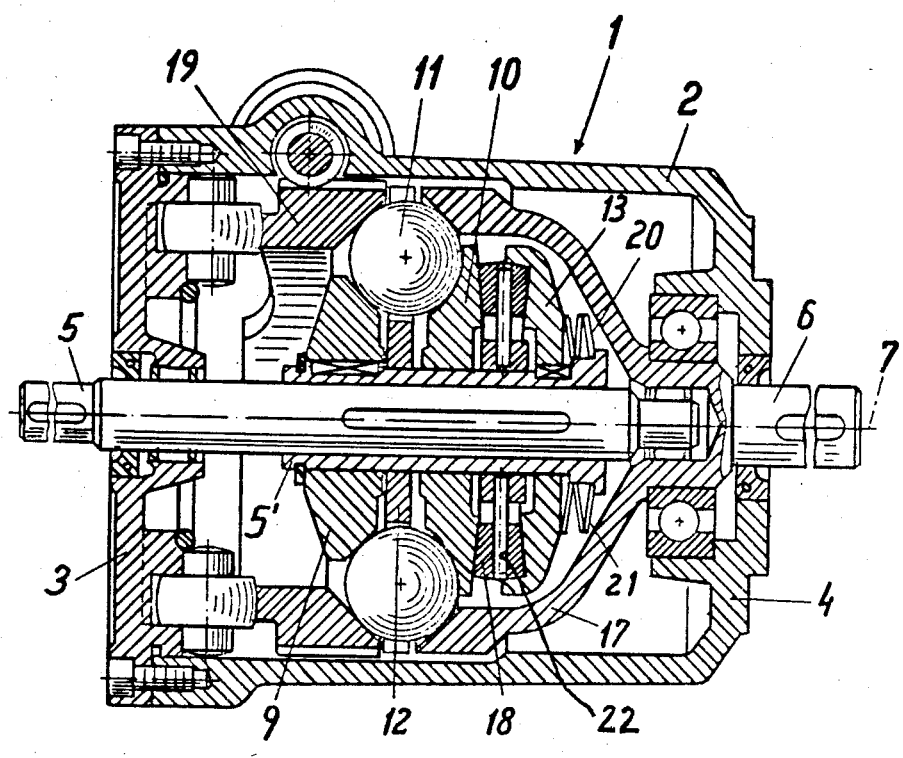
FIG. 1 is a sectional side view of a ball-type planetary gear set with the pressing device according to this invention in which by way of an example cone-shaped rolling bodies are used.

The ball-type planetary gear set 1 illustrated in the drawing includes a housing assembled of a cylindrical housing shell 2 closed at its ends with housing covers 3 and 4. The left-hand cover 3 supports for rotation a driving shaft 5 and the right-hand housing cover 4 supports a driven shaft 6; both shafts 5 and 6 are aligned along a common center axis 7 which forms the main axis of the gear set.

A sleeve 5' is keyed to the driving shaft 5 and supports a pair of races 9 and 10. The race 9 is fixedly mounted on the sleeve 5' to rotate jointly with the driving shaft 5. The other race 10 is freely supported on the sleeve 5' to rotate independently from rotation of the driving shaft, and being movable also in the axial direction. The facing surface portions of respective races 9 and 10 are formed with raceways which engage from below a plurality of planetary balls 11. The raceway of the fixed race 9 is a bevelled surface, whereas the raceway of the freely shiftable race 10 has a curved shape matching the planetary balls 11. The planetary or pressure-transferring balls 11 are spaced apart from each other at regular angular intervals by means of a spacer 12 which is freely rotatable on the sleeve 5'. In the embodiment of FIG. 1, the end surface of the freely rotatable race 10 remote from the balls is inclined toward the shaft and faces a pressure disk 13 which is mounted on the sleeve 5' for joint rotation with driving shaft 5 and for axial displacement on the sleeve. The pressure disk 13 is a component part of a pressing device which will be explained in more detail below.

An additional, cup-shaped race 17 is fixed to the driven shaft 6 to rotate jointly therewith and is formed at its end with a bevelled raceway which engages from above the planetary balls 11. The cup-shaped driven race 17 encloses the pressure plate 13 and the freely rotatable race 10 and its central part is constructed as a journal for the free end of the driving shaft 5. An adjustment guide ring 19 is arranged around the left-hand part of the driving shaft 5 and is provided with a bevelled raceway which engages from above the planetary balls 11 in cooperation with the raceway of the driven race 17.

Figure 2:
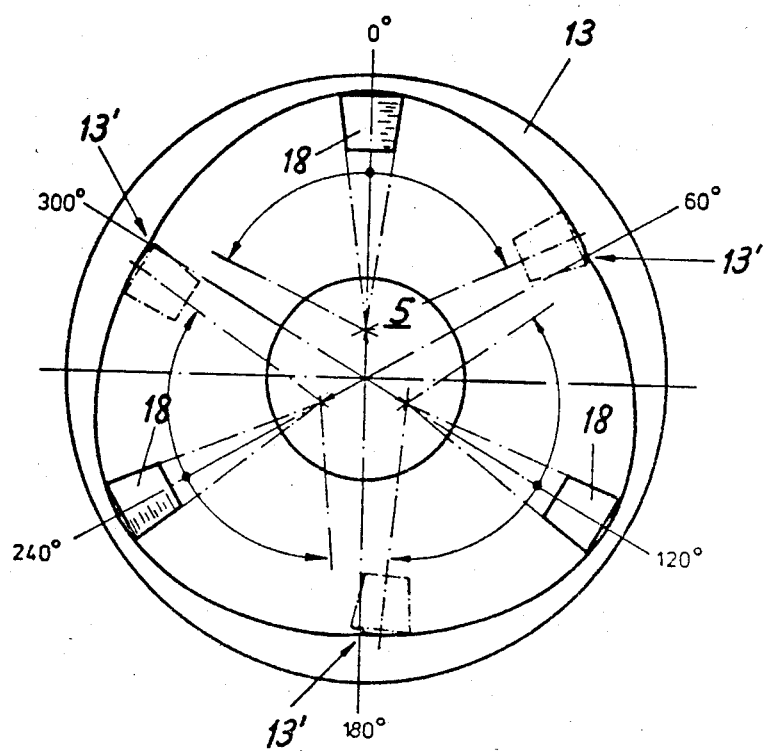
FIG. 2 is a schematic front view of a pressure plate in the pressing device of this invention provided with a circumferential cam for imparting spiral movements to rolling bodies which in this example have a conical shape.

The pressing device in the embodiment shown in FIGS. 1 and 2 includes a plurality of cone-shaped rolling bodies 18 arranged between the correspondingly sloping end surfaces of the freely rotatable race 10 and the pressure disk 13. The rolling bodies 18 follow a circumferential cam 13' formed on the pressure disk 13 and are guided in radial direction relative to the driving shaft 5 by guiding rods 22. The pressure plate 13 transmits via the cone-shaped bodies 18 the rotary movement of the driving shaft 5 to the freely rotatable race 10. When a torque develops between the pressure plate 13 and the free race 10, the conical bodies start rotating about the radial guides 22, and simultaneously are displaced by the cam 13' in the radial direction, thus performing a movement about a spiral path until the relative movement between the race 10 and the pressure plate 13 is equalized.

According to another feature of this invention, a pressure spring 21 rests on a limit stop and loads the axially shiftable pressure plate 13 against the race 10. In this manner, the tapering surfaces of the race 10 and of the pressure plate 13 engage the matching opposite surface portions of the cone-shaped rolling bodies 18 even if very small negative or positive torsional moments occur.

Figure 3:
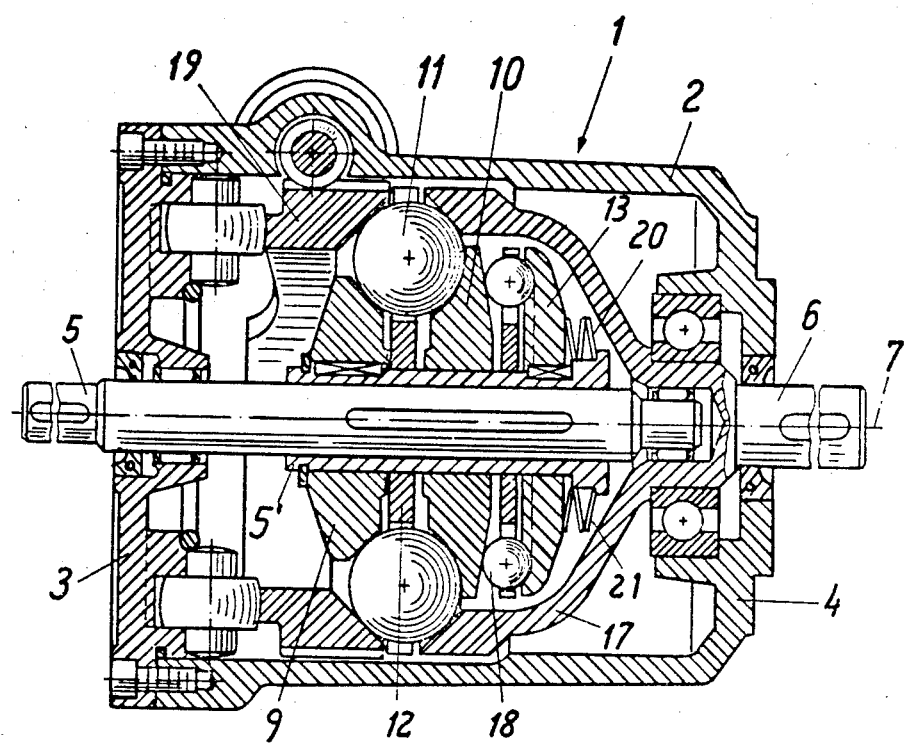
FIG. 3 is a sectional side view of a modification of the device of FIG. 1 in which rolling bodies are balls.
Figure 4:
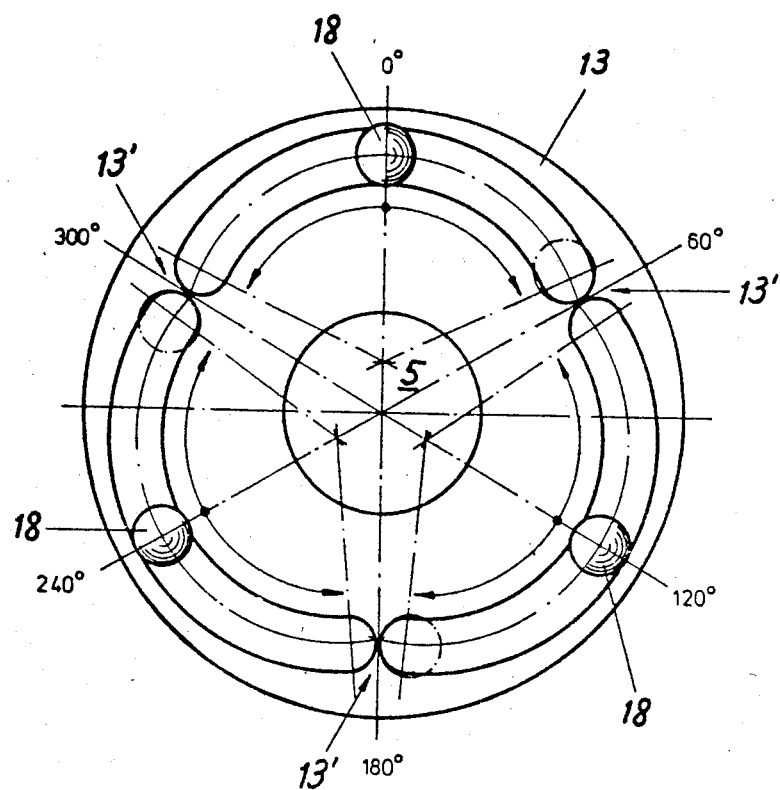
FIG. 4 is a schematic front view of a pressure plate in the device of FIG. 3 in which the spherical rolling bodies are guided in camming surfaces in the form of curved grooves.

The rolling bodies in the pressing device of this invention may have a different configuration, as illustrated by way of an example in FIGS. 3 and 4, where the rolling bodies 18 have a spherical shape. In this embodiment, the end surface of pressure disk 13 facing the sloping end surface of the freely rotatable race 10 forms right angles with the center axis 7 and the cam 13' engages respective spherical bodies 18 is in the form of arcuate guiding grooves (FIG. 4). In this modification, the guiding rods are dispensed with.

It will be understood that each of the elements described above, or two or more together, may also find a useful application in other types of constructions differing from the types described above.

While the invention has been illustrated and described as embodied in a pressing device for use with ball-type planetary gear sets, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. In a continuously adjustable ball-type planetary gear set having a housing, a driving shaft and a driven shaft supported respectively in said housing for rotation about a common axis, a plurality of planetary balls, a first race mounted on said driving shaft for joint rotation therewith, a second race slidably supported on said driving shaft for free rotation and for axial displacement relative to said first race, said first and second races being provided with inner raceways for engaging those surface portions of said planetary balls which face said driving shaft, a third race connected for joint rotation with said driven shaft, a fourth race arranged for free rotation about said common axis opposite said third race, said third and fourth races being provided with raceways for engaging those surface portions of said planetary balls which are remote from said driving shaft, a combination comprising a torque-dependent pressure mechanism having a pressure plate mounted on said driving shaft for joint rotation therewith; said pressure plate and said second race having inclined facing surfaces defining a converging annular gap therebetween; a plurality of rolling bodies arranged in said annular gap and engaging said facing surfaces; and cam means arranged for joint rotation with said driving shaft and engaging radially said rolling bodies to displace the same radially along said inclined facing surfaces thus imparting to said rolling bodies a rotation about a helical path when a torque develops between said inclined facing surfaces.

2. A combination as defined in claim 1, wherein said pressure plate is axially displaceable relative to said second race.

3. A combination as defined in claim 2, wherein said rolling bodies have a conical shape, said cam means being in the form of a continuous sinus shaped guide engaging said rolling bodies, and said rolling bodies being rotatable about and displaceable along guiding rods extending radially relative to said driving shaft.

4. A combination as defined in claim 2, further comprising a biasing spring loading said axially displaceable pressure plate in axial direction toward said second race.

5. A combination as defined in claim 4, wherein said biasing spring rests on a limit stop for said pressure plate.

6. A combination as defined in claim 2, wherein said rolling bodies have a spherical shape and said cam means are discrete curved grooves formed in circumferential portions of said pressure plate and assigned to respective rolling bodies.

7. A combination as defined in claim 2, wherein said first and second races and said pressure plate are mounted on a sleeve keyed to said driving shaft for joint rotation therewith and for displacement in axial direction.

8. A combination as defined in claim 1, wherein said first race is axially displaceable relative to said driving shaft.

* * * * *